Patented Apr. 6, 1948

2,439,068

UNITED STATES PATENT OFFICE 2,439,068

SOFT LEAD SOLDER

George H. Worrall, Kirkwood, Mo., assignor to National Lead Company, New York, N. Y., a corporation of New Jersey No Drawing. Application January 15, 1944, Serial No. 518,405

3 Claims. (Cl. 75—166)

This invention relates to solders, particularly to lead-tin solders. It has special reference to a composition containing additional metallic elements which impart new and desirable characteristics to lead-tin alloys containing tin in relatively low proportions.

A number of low tin soft solders as well as solders containing other elements alloyed to lead in place of tin have been proposed. It is to be expected that such alloys will have a higher liquidus temperature at which all constituents remain liquid, and that this characteristic will somewhat adversely affect the speed and the accustomed ease with which soldering operations may be performed. Furthermore, the low tin or substitute tin compositions previously proposed are characterized in general by poorer "wetting" properties and somewhat restricted flow. Also, particularly when used on hand operations for which it is customary to use soldering "irons" or more properly soldering coppers, the previously proposed solders exhibited what may be termed "dirty working" properties.

It is the object of this invention to improve the working properties of low tin solders. It is the further object to make possible the use of low tin solder for certain special purposes for which only high tin solders could previously be used with success. Other objects of the invention will become apparent as the description thereof proceeds.

Where low tin solders are necessary it has been found advantageous from the standpoint of both liquidity and strength to add a small amount of antimony. According to the present invention, it has been further found that a very small amount of another metallic constituent, when added either to a lead-tin alloy or the ternary lead-tin-antimony alloy improves the fluidity and clean working properties of the solder. A novel characteristic of the product of this invention is the partially self-fluxing nature of the solder when it is used with acid fluxes.

The effect of the added element is two-fold; it reacts with an acid flux and at the same time produces a reaction product which is in itself a good flux. The metal which has been found useful in the practice of the present invention is zinc. This metal should be present in but small amounts not to exceed about 0.5% by weight and preferably in amounts between about 0.005% and about 0.1% by weight.

By the term acid flux is meant either hydrochloric (muriatic) acid or any of the zinc chloride fluxes to which it is common and advisable to add a small amount of hydrochloric acid. Such fluxes contain water in widely varying amounts, normally from 50% to 75% more or less. While ammonium chloride may be a minor constituent and while such a flux will operate successfully with the improved solder of this invention, it is preferred to use a zinc chloride flux acidulated with a small amount of hydrochloric acid.

In view of certain restrictions made under war time conditions solders containing not more than about 21% tin are of special interest. In a solder containing such an amount of tin, balance lead, the properties of liquidity and tensile strength are considerably improved by the addition of small amounts of antimony not to exceed about 2.0% by weight and preferably between about 0.5% and about 1.75%. Larger amounts of antimony will cause a further gain in liquidity but only at the expense of brittleness, impact strength and a considerably lessened flow or spreading characteristic. Consequently, with such a lowered tin content it has been found that it is of no advantage to increase the amount of antimony above about 2.0%.

When such low tin solders of the prior art are used for dip soldering operations or other operations requiring a molten solder bath, they function about as well as can be expected on account of their lower tin content, and an operator gradually becomes accustomed to their use. However, for hand operations involving the use of soldering coppers, or for certain special purposes as, for instance, in the operation where a drop of solder from a well-tinned soldering copper is needed to seal the filling hole in a milk can or the escape hole in a food can which has been pasteurized, various additional difficulties are encountered. The soldering copper becomes dirty very quickly due to the drossing of the solder metal at the higher temperature necessitated by the use of such low tin solders, and it has been previously found to be highly impractical if not impossible to use anything but high-grade solder such as a 50–50 lead-tin solder for such purposes. In these operations which are known as "tipping," the improved flow and clean operation of our improved solder is especially notable and the product of this invention can be successfully used with great ease. In the tipping operation a drop of solder leaves the well-tinned soldering copper at the moment when an acid flux is sprayed at the point of contact. In some cases a machine applies the flux to the can by means of two wicks just before the can moves to the soldering iron.

With the use of the improved solder of this invention it is immediately evident that the soldering copper stays clean for a long time, and the solder flows and spreads readily. This is due to the fact that when the molten solder comes in contact with an acid flux, a chemical reaction immediately takes place forming small amounts of zinc chloride at the surface of the solder metal. This takes place just at the right moment and may be termed a partially self-fluxing action. It is also readily evident that the use of our improved solder makes possible faster work particularly with all types of hand operations using soldering coppers.

A specific example of a solder metal which is recommended for use with an acid flux and which serves to illustrate a product of this invention is as follows, the proportions being by weight:

|  | Per cent |
|---|---|
| Tin | 20 |
| Antimony | 0.8 |
| Zinc | 0.025 |
| Lead | Balance |

Such a solder will have approximately the following physical properties:

| | |
|---|---|
| Ultimate tensile strength p. s. i. | 5830 |
| Elongation per cent | 32 |
| Brinell hardness number | 10 |
| Liquidus temperature °F | 520 |

Such a solder flows and acts about like a 50-50 solder in that it keeps the soldering copper tinned, clean and free from dross for a considerable time. Furthermore, it will be found that the improved solder of the present invention shows particularly good wetting properties on all metal surfaces when properly fluxed.

The amount of zinc which produces the best results is solders of small cross sectional dimensions such as are used in hand soldering with soldering coppers, is between about 0.005% and about 0.05% by weight. On the other hand where a dip soldering operation is concerned, a molten bath of the solder tends to slowly lose zinc over any considerable period of time and therefore a greater intial amount is required to be present in the solder metal.

While, as has been previously stated, the antimony, if present, should generally not exceed about 2.0% by weight, it is by no means necessary to have any antimony present to gain the beneficial effect of the presence of zinc, nor is the amount of zinc dependent in any way, as far as can be determined, on the presence or absence of antimony. This invention contemplates adding zinc in the amounts stated to a lead-tin solder with or without the added presence of antimony.

Tests made on soldered joints show a better seam penetration and an increased joint strength of the solder of this invention when compared with solders of exactly similar composition except for the presence of zinc. It will be further appreciated that the use of the improved solder of this invention assures greater life to soldering coppers and tinning rolls such as are used on can making machines and a consequently greater period of use before reconditioning or cleaning becomes necessary.

Tests made on galvanized iron, cold rolled steel, tinplate, copper, brass, zinc, terne metal, and stainless steel all showed that the solder of this invention works and flows perfectly and joint strength tests on all these materials showed in general an improved performance.

It is to be understood that the foregoing description of the present invention has been given merely for illustrative and not limitative purposes. Therefore, it will be appreciated that there is no intention of excluding from the scope of the present invention such changes and modifications as may be accomplished by the mere skill of the art.

I claim:

1. A solder composition useful with acid fluxes comprising by weight about 20% tin, from above 0.005% to about 0.5% of zinc and the balance substantially all lead.

2. A solder composition useful with acid fluxes consisting by weight of about 20% tin, from above 0.005% to about 0.5% of zinc, from about 0.5% to about 1.75% antimony, and the balance substantially all lead.

3. A solder composition useful with acid fluxes consisting by weight of about 20% tin, about 0.025% zinc, about 0.8% antimony and the balance substantially all lead.

GEORGE H. WORRALL.

REFERENCES CITED

The following references are of record in the file of this patent:

UNITED STATES PATENTS

| Number | Name | Date |
|---|---|---|
| 490,840 | Wegner | Jan. 31, 1893 |
| 500,125 | Guttner | June 27, 1893 |
| 1,766,871 | Beckinsale | June 24, 1930 |
| 1,860,095 | Harris | May 24, 1932 |

FOREIGN PATENTS

| Number | Country | Date |
|---|---|---|
| 118 | Great Britain | Aug. 27, 1914 |
| 315,074 | Germany | Oct. 10, 1919 |
| 105,532 | Austria | Feb. 10, 1926 |

OTHER REFERENCES

Campbell, "A List of Alloys," 1930 ed., pages 49 and 50, pub. by American Society for Testing Materials, Philadelphia, Pa.